Patented May 8, 1934

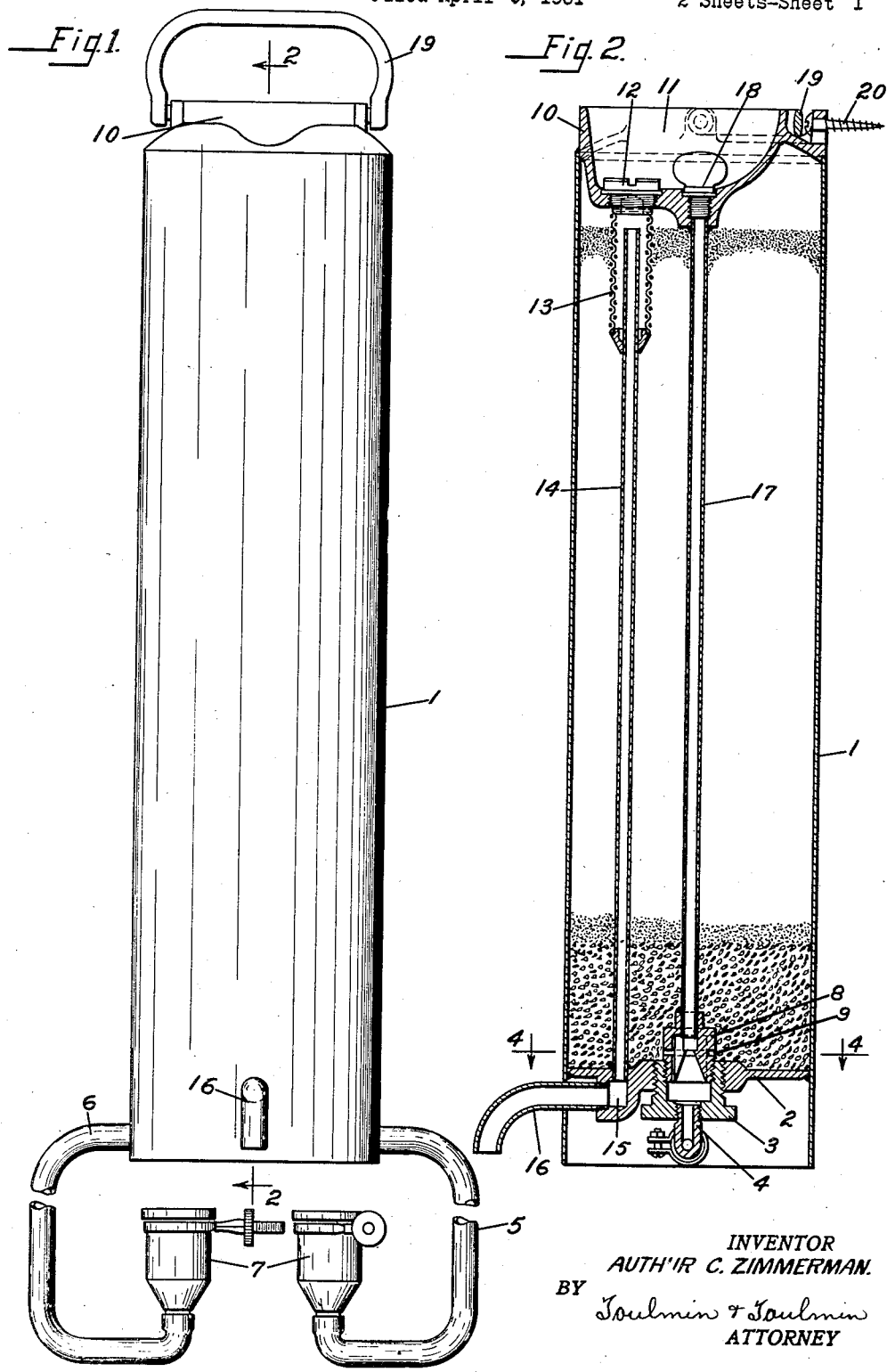

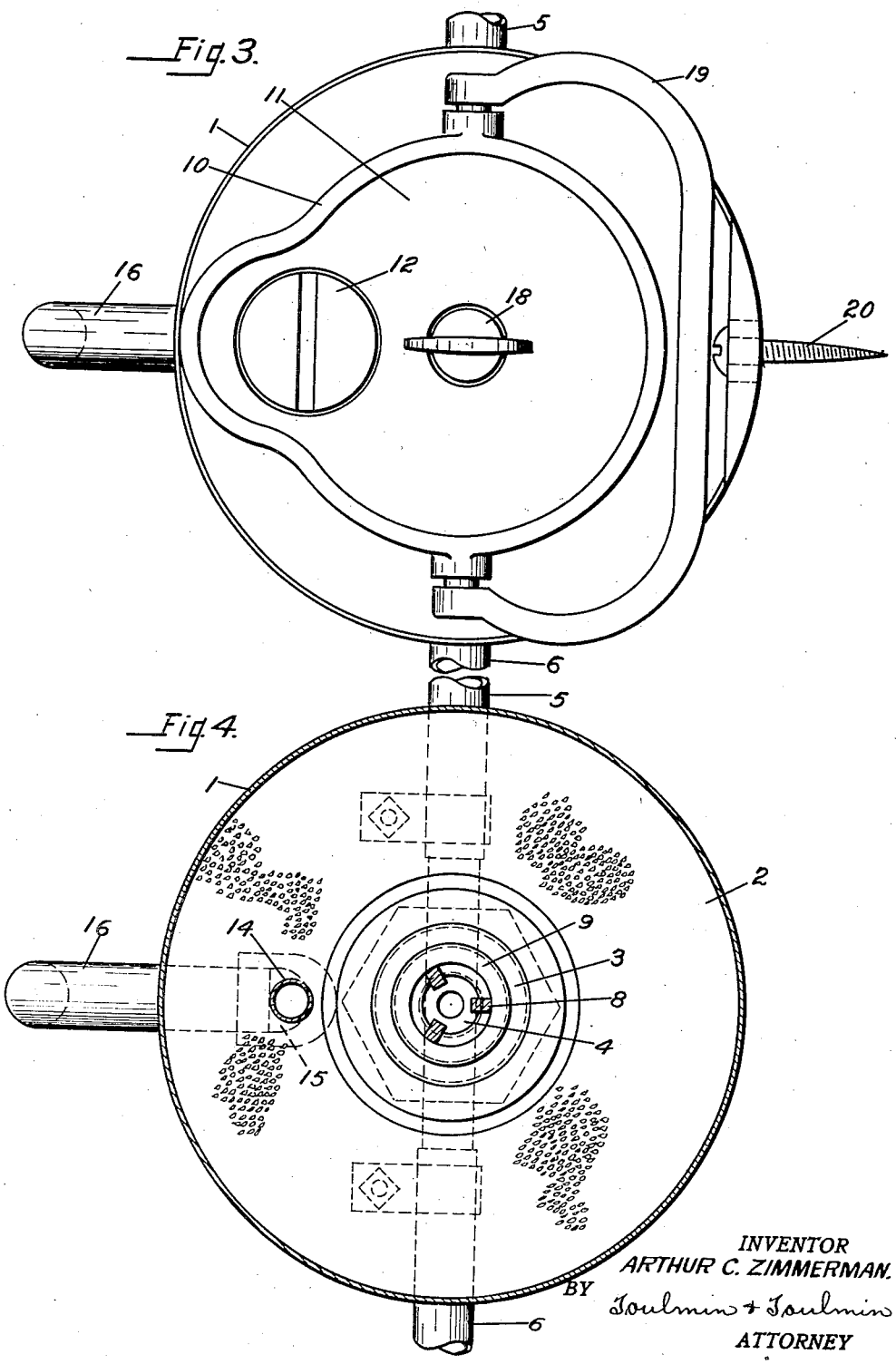

1,958,176

UNITED STATES PATENT OFFICE 1,958,176

PORTABLE WATER SOFTENER

Arthur C. Zimmerman, Dayton, Ohio, assignor to The Duro Company, Dayton, Ohio, a corporation of Ohio Application April 6, 1931, Serial No. 527,874

14 Claims. (Cl. 210—24)

This invention relates to portable water softeners, and has for its object to provide a water softener composed of one tank, in which the direction of flow for both softening and regenerating is the same.

It is the object of this invention to provide, in connection with a single tank, means for admitting hard water to the bottom of the tank and directing the water up through the tank and down through a pipe within the tank for service purposes.

It is also an object of this invention to provide a single tank softener in which the salt is admitted at the upper end of the tank, directed toward the bottom and from the bottom up through the body of the tank, and out through a second pipe to the bottom of the tank.

These and other advantages will appear from the following description taken in connection with the drawings.

Referring to the drawings:

Figure 1 is a side elevation of a complete apparatus.

Figure 2 is a vertical section on the line 2—2 of Figure 1.

Figure 3 is a top plan view.

Figure 4 is a section on the line 4—4 of Figure 2.

In this apparatus one tank is used for softening and regenerating purposes, and is indicated by the numeral 1. This tank has a bottom 2, which has an opening in the center thereof for a plug 3. This plug is cup-shaped and is threaded into the bottom, and has an opening in the bottom thereof to receive an inlet tap or connection 4, which has extending therefrom water pipes 5 and 6. One of these pipes is used for hot water and the other for cold water and may be attached to spigots by means of taps 7.

Threaded into the plug 3 is a distributor head 8, which has laterally extending openings 9 therein for the passage of water from the distributor head. On top of the tank is a top 10, which has in the upper surface thereof a depression in the form of a hopper 11. In this top is a hole filled by a plug 12, from which extends a strainer 13. Extending into the lower end of the strainer 13 and substantially to the top is a pipe 14, the lower end of which extends into a chamber 15 formed in the bottom of the tank.

Extending laterally from this chamber is an outlet 16 for the discharge of water from the tank, either softened water or water during the process of regeneration. In addition to the opening filled by plug 12 there is another opening in which one end of a pipe 17 is fastened. This opening is filled by a plug 18 for closing the upper end of pipe 17. The lower end of this pipe 17 extends into the distributor head 8 so that by removing the plug 18 water or brine may be poured into the hopper and run through the pipe 17, up through the minerals in the tank, through the strainer 13, down through the pipe 14 and out of the pipe 16. This is the course the brine takes during the steps of regeneration.

Whenever the water is being softened it enters through one of the pipes 5 or 6, depending upon whether it is hot or cold water. From this pipe the water passes into the distributor head and from the distributor head through the openings 9, into the bottom of the tank and the minerals therein. The water then passes up through the tank, through the strainer 13, down the pipe 14 and out through the outlet 16 for service.

In order that the tank may be easily transported there is provided on the upper end a handle 19, as clearly shown in Figure 1. There is also provided at one side of the upper end of the tank screw means 20 by which the tank may be affixed to some object to prevent its being turned over. The cover and the bottom may be removed from the other part of the tank.

Assuming that the tank is filled with softening material, water is admitted through the pipes 5 or 6 into the distributor head, from which it passes up through the minerals, down through pipe 14 and out to service. When it becomes necessary to regenerate the softening material within the tank the water supply is cut off, plug 18 is removed and brine is poured into the hopper and passes down through the pipe 17, into the distributor head, up through the tank, through the strainer 13 and out through pipe 14 until the material in the tank has been sufficiently regenerated, after which the plug 18 is replaced and the apparatus is ready for use.

I desire to comprehend within my invention such modifications as may be embraced within my claims and the scope of my invention.

Having thus fully described my invention, what I claim as new and desire to secure by Letters Patent, is:

1. In a portable water softener, a tank having a bottom and a removable top, a distributor head in the bottom having openings into the tank, an outside water pipe connected to the distributor head, a brine pipe in said tank extending from the top to the head and serving to hold the top on the tank, and a water outlet from said tank.

2. In a portable water softener, a tank for softening material having a bottom and a top, a distributor head in the bottom having openings into the tank, said top forming a brine-receiving receptacle, an outside pipe connected to said distributor head, a brine pipe extending from the brine-receiving receptacle to the distributor head, and an outlet from the tank.

3. In a portable water softener, a tank having a bottom with an inlet and outlet therein and a top having two openings therein, a distributor head over said inlet, a brine pipe extending from the distributor head to one opening in the top, a plug in the other opening having a strainer extending into the tank, and a pipe extending from the outlet into the strainer.

4. In a portable water softener, a tank having an inlet and an outlet for water and adapted to contain a softening material, a removable top for the tank, a distributor head over the inlet, means independent of the inlet to supply brine to the distributor head, and means to cause the water and the brine to pass through the softening material in the tank and discharge it through the outlet, said means comprising a pipe having one end in the outlet and a strainer on the other end of the pipe supported by the top.

5. In a portable water softener, a tank adapted to contain a softening material, said tank having a bottom with an inlet and an outlet therein and a top with a brine opening and a strainer opening therein, a brine pipe connecting the brine opening with the distributor head, a plug for closing the brine opening, a pipe having one end in the outlet extending up therefrom toward the strainer opening, and a plug for closing the strainer opening, said plug having a strainer thereon fitting over the other end of the pipe.

6. In a water softener, a tank, a detachable bottom for the tank having an inlet opening and an outlet opening for water, a distributor over the inlet, a cover for the tank, said cover having therein a brine hopper, a brine pipe extending from the hopper to the distributor, and means to close the brine pipe.

7. In a water softener, a tank, a detachable bottom for the tank having an inlet and an outlet, a distributor head over the inlet, a removable cover for the tank, said cover forming a brine hopper with two holes in the bottom thereof, a brine pipe having one end in one hole and its other end in the distributor head, a strainer plug having a strainer thereon in the other hole, and a pipe extending from the strainer to the outlet.

8. In a water softener, a tank having a bottom and a cover, a brine pipe connecting the cover and the bottom and having an outlet adjacent the bottom, said cover having a hopper open into the brine pipe, and an outlet member connecting the cover and the bottom, said outlet member having an inlet adjacent the cover and an outlet through the bottom.

9. In a water softener, a tank having a bottom and a cover forming a hopper, a brine pipe connecting the cover and the bottom and having an inlet through the cover from the hopper and an outlet adjacent the bottom, and an outlet member connecting the cover and the bottom, said outlet member having an inlet screen adjacent the cover and an outlet through the bottom.

10. In a portable water softener, a tank having a cover with a brine depression therein and a handle recess in one side, and a handle pivoted to the cover on each side of the depression and adapted to lie in the recess when not in use.

11. In a water softener, a tank having a removable cover with a brine depression therein, a brine pipe detachably connected to the cover and leading from the depression, and a water discharge pipe detachably connected to the cover and having an inlet adjacent the cover.

12. In a water softener, a tank having an opening in the bottom thereof, a cup-shaped plug detachably mounted in the opening, said plug having an inlet, and a distributor head detachably mounted in said plug and for forming therewith an inlet chamber having discharge openings into the tank.

13. In a water softener tank, a bottom therefor having a discharge opening and an inlet opening, and water distributor means in said inlet opening, said means comprising a cup-shaped plug threaded into the inlet and a distributor head threaded into the cup-shaped plug, said plug and head forming a distribution chamber having laterally extending openings.

14. In a portable water softener, an annular casing, a bottom member therefor having inlet and outlet passageways, a salt pipe mounted therein, a common distribution means for said salt pipe and said inlet passageway, an outlet water pipe extending from said bottom member to near the top of the water softener, a cover member on said casing comprising an open receiver for brine, said salt pipe communicating with the interior thereof, a detachable plug between said interior and said salt pipe, a detachable plug and depending screen telescopically arranged around said water outlet pipe and carried by said head.

ARTHUR C. ZIMMERMAN.